Figure 1:
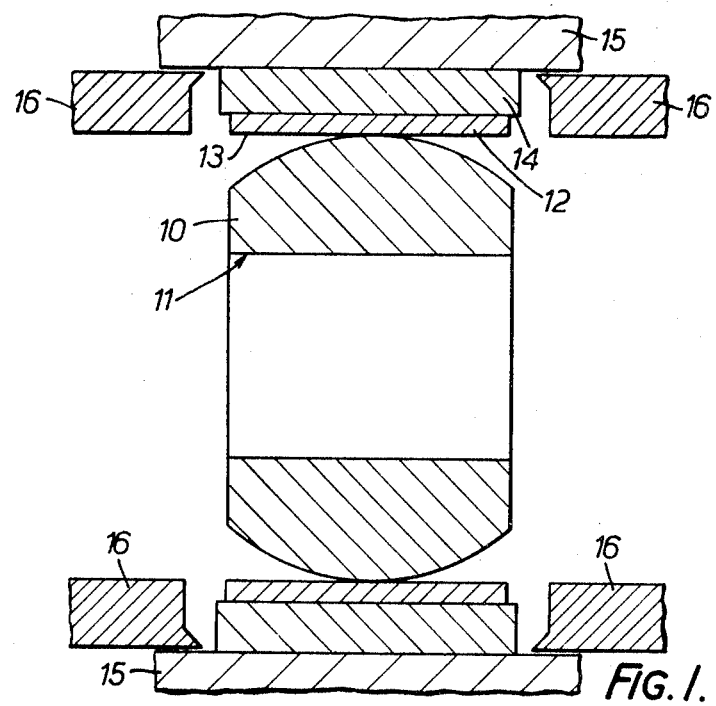

United States Patent [19]

Romer et al.

[11] 3,736,635
[45] June 5, 1973

[54] METHOD OF MAKING A BALL AND SOCKET JOINT

[75] Inventors: Hugh Frank Romer, Bushey; Rodney Thomas Beazley, Maidstone, both of England

[73] Assignee: The Glacier Metal Company Limited, Wembley, Middlesex, England

[22] Filed: Mar. 8, 1971

[21] Appl. No.: 122,020

[30] Foreign Application Priority Data

Mar. 9, 1970 Great Britain..................11,186/70

[52] U.S. Cl..............................29/149.5 B, 29/441
[51] Int. Cl........................B21d 53/10, B23p 11/00
[58] Field of Search..................29/149.5 B, 149.5 R, 29/441, 149.5 NM

[56] References Cited

UNITED STATES PATENTS

| 3,085,312 | 4/1963 | Evans | 29/149.5 B |
| 3,193,910 | 7/1965 | Evans | 29/149.5 B |
| 3,452,415 | 7/1969 | Beazley et al. | 29/149.5 B |
| 3,526,940 | 9/1970 | Beazley et al. | 29/149.5 B |

*Primary Examiner*—Thomas H. Eager
*Attorney*—Pierce, Scheffler & Parker

[57] ABSTRACT

A method of making a ball and socket joint in which the ball is placed inside two co-axial cylindrical blanks which are then placed in a die which prevents outward expansion of the blanks. Force is then applied to the ends of the blanks to deform them to form the socket with the inner surface of the inner blank forming a bearing surface for the ball.

5 Claims, 2 Drawing Figures

PATENTED JUN 5 1973  3,736,635

INVENTORS
RODNEY THOMAS BEAZLEY
HUGH FRANK ROMER.

METHOD OF MAKING A BALL AND SOCKET JOINT

This invention relates to a method of making spherical bearing assemblies hereinafter referred to as ball and socket joints, and more particularly to a method of manufacturing such assemblies. These assemblies comprise primarily two members, an annular outer member constituting the socket portion embracing the inner member and having an inner convex surface constituting a bearing surface in sliding engagement with the surface of the inner member which is spherical in configuration and usually has a shank or pair of co-axial shanks projecting radially from it or is provided with a bore through which such a shank can pass with a close fit. The method is particularly, although not exclusively, applicable to the manufacture of large joints such as those in which the ball has a diameter of about 1 foot (304 mm) although the ball may have a diameter of about 6 inches (152 mm).

According to one aspect of the present invention there is provided a method of manufacturing a ball and socket joint comprising; locating the ball in a pair of co-axial cylindrical blanks, the inner blank of the pair having an internal diameter approximately equal to the external diameter of the ball and an external diameter approximately equal to the internal diameter of the outer blank; locating the ball and the blanks in a die whose internal dimension is approximately equal to the outer dimension of the outer blank; and applying pressure between the ends of the blanks to deform the blanks to form the socket member by causing the inner blank to conform with the bearing surface of the ball.

The end pressure is preferably applied only to the outer blank. Then if as is preferred, the inner blank has an internal surface comprising a layer of self-lubricating bearing material such as Glacier DU or Glacier DX (Registered Trade Marks), the deforming pressure being transmitted to the inner blank through the outer blank is not likely to damage the bearing material.

The inner blank may be shorter than the outer blank to permit the metal of the ends of the outer blank to flow over the ends of the inner blank under pressure in the die, thus providing positive retention for the inner blank.

The blanks may be cylinders or bushes with one or more slots extending therethrough, which slots may be used to release a too tight grip on the ball by the socket and provide a working bearing clearance after the cylinders have been pressured or crimped on to the ball. Other methods of loosening this grip to provide a working tolerance between the ball and socket; are by rolling and extending the peripherallength of the outer surface of outer and inner bushes, by placing spacing means between the adjacent edges of one or at least one, of the slots; or by putting some ephemeral or short-lived material between the ball and socket before deforming.

A preferred method of providing working clearance between the ball and the inner bush is by indenting the outer bush in the region of its slot. This causes the outer bush to deform and so spread apart the two sides of the slot in the bush and the slot is at least partially bridged by the deformed material of the bush. This loosens the outer bush on the slit inner bush which then expands to conform to the size of the outer bush and provide the required working clearance.

According to a second aspect of the present invention a ball and socket joint comprises a ball whose outer surface is in sliding relation with the inner surface of an inner annular member, the outer surface of the inner annular member being in contact with but not connected to the inner surface of an outer annular member.

Figure 2:
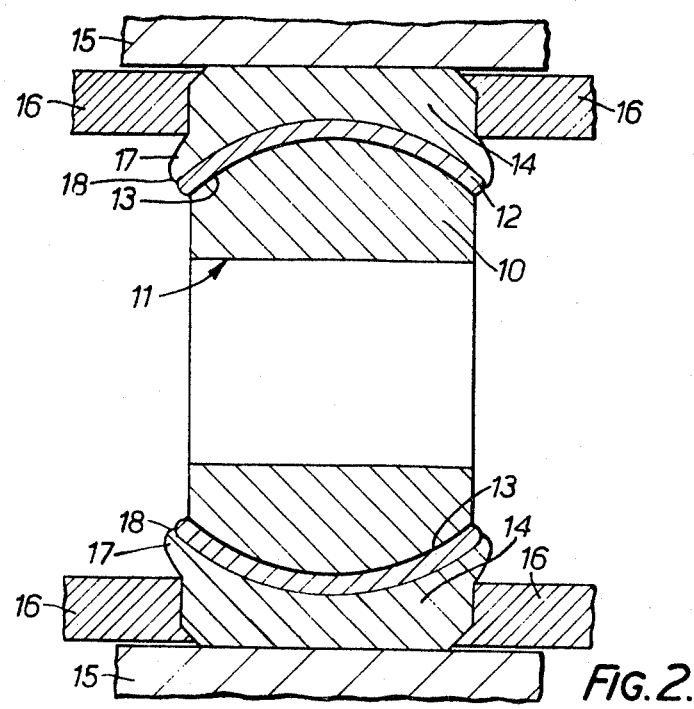

An embodiment of the invention will now be described, by way of example only, with reference to the accompanying drawings, in which:

FIG. 1 is a longitudinal section through a ball and socket assembly disposed in a die prior to formation; and FIG. 2 is a portion of a like section after formation has been effected.

Referring to the drawings, a steel ball segment 10 having a bore 11 extending centrally therethrough is located in an inner cylindrical member 12. This member has an internal surface 13 of self-lubricating material such as Glacier DU or Glacier DX (Registered Trade Marks) which is attached permanently to the hard steel backing which constitutes the remainder of the cylinder.

The inner cylindrical member is a close fit in an outer cylindrical steel bush 14 which in turn is disposed in a die 15. The inner cylindrical member 12 is symmetrically disposed in the outer member and is somewhat shorter axially than the outer bush 14, such that on applying pressure through press members 16 at both ends of the bush 14 simultaneously, the metal in the outer bush 14 forces the inner member 12 to embrace the surface of the ball while the ends of the outer bush 14 tend to flow as shown at 17, FIG. 2, and may even extend to grip the ends of the inner member as shown at 18.

It will be noted that by the use of this method the forming force is applied directly to the outer cylindrical member and not to the inner member 12 which carries the layer of bearing material; only indirect pressure is applied more or less uniformly over the whole back or less vulnerable portion of this member to bring the bearing surface into contact with the steel ball. Thus if say Glacier DU (Registered Trade Mark) is used as the so-called bearing material it is not subjected to any deleterious deformation.

The relationship of the dimensions of the bush 14 and the press members 16 to those of the inner member 12 can be varied in accordance with the requirements of a particular application.

Both the inner cylindrical member 12 and the outer cylindrical bush 14 may have an axial slot therein by means of which working clearance between the member 12 and the ball segment 10 is provided. When pressure is applied to the ends of the bush 14 the slots in both members 12 and 14 close so that the inner member fits about the ball segment. Clearance may be provided by rolling and extending the peripheral length of the outer bush or by placing spacing means between the adjacent sides of the slot in the outer bush. Both these methods increase the circumferential length of the outer bush and permit the inner member to expand to conform to the inner surface of the outer member.

A preferred method of providing working clearance is to indent the outer bush in the region of the closed slot. This indenting is easily done with a chisel and it is found that this method causes the outer member to expand by spreading apart the two sides of the slot and causing metal to flow to close the slot in the region of the impact. As the inner member is still split it expands to conform to the inner dimension of the outer member to provide the working clearance. The deformation takes place directly only on the outer member so that the delicate bearing material on the inner surface of the inner member is not subjected to deformation.

What we claim as our invention and desire to secure by Letters Patent is:

1. A method of making a ball and socket joint comprising locating a ball in a pair of co-axial cylindrical blanks, the inner blank of the pair having an internal diameter approximately equal to the external diameter of the ball and an external diameter approximately equal to the internal diameter of the outer blank, and the inner blank being axially shorter than the outer blank; locating the ball and the blanks within a die whose internal dimension is approximately equal to the outer dimension of the said outer blank, applying pressure between the ends of the outer blank to deform the blanks to form the socket member by causing the said inner blank to conform with the bearing surface of the ball, and causing the metal of the ends of the outer blank to flow over the ends of the inner blank while the blanks remain in the die thereby retaining the inner blank positively.

2. The method as claimed in claim 1 wherein the cylindrical blanks have one or more axial slots therein and working clearance is provided between the ball and the inner blank by placing spacing means between one, or at least one, of the slots.

3. The method as claimed in claim 1 wherein working clearance is provided between the ball and the inner blank by putting a short-lived material between the ball and inner blank before deformation.

4. The method as claimed in any of claim 1 wherein working clearance is provided between the ball and the said inner blank after deformation by extending the means circumferential length of the inner blank by rolling the outer surface of the outer blank.

5. The method as claimed in any of claim 1 in which the cylindrical blanks have one or more slots therein and working clearance is provided between the ball and the inner blank after deformation by indenting the outer blank in the region of the slot.

* * * * *